May 1, 1923.
J. F. O'CONNOR
1,453,694
FRICTION SHOCK ABSORBING MECHANISM
Filed July 11, 1921
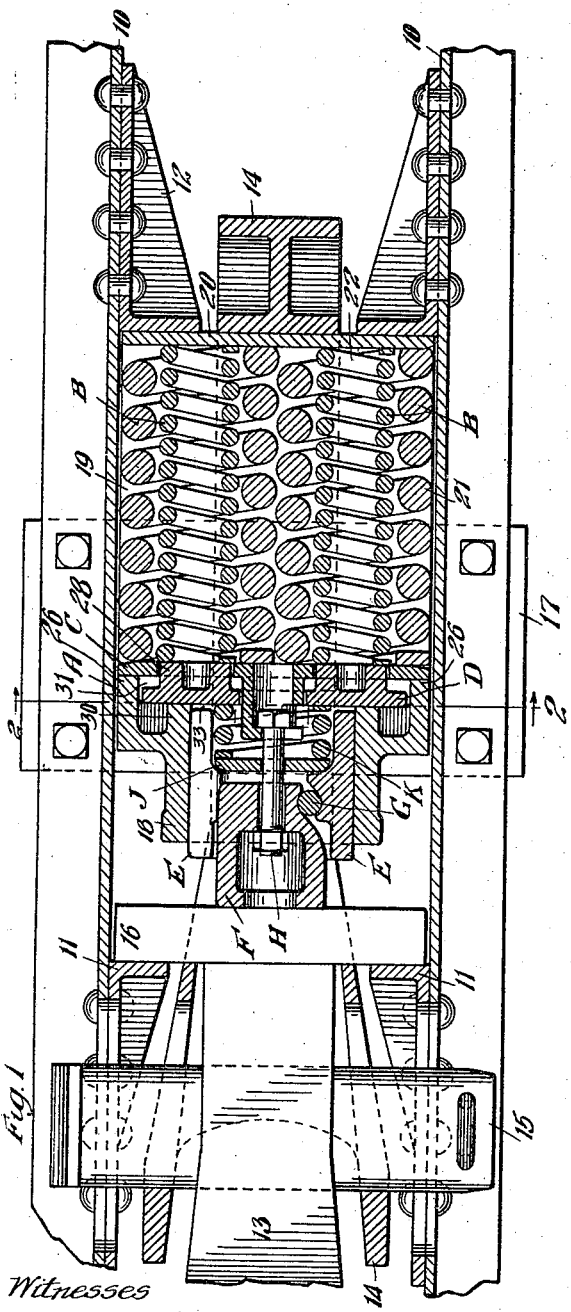
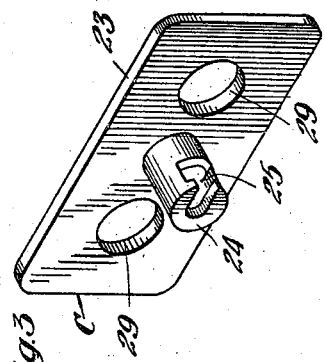
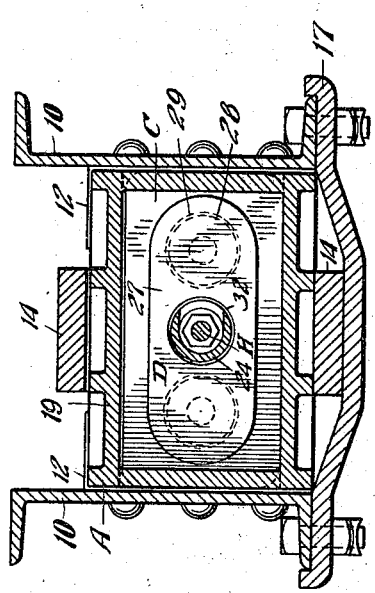
Witnesses
Wm. Geiger
Inventor
John F. O'Connor
By Geo. I. Haight
His Atty.

Patented May 1, 1923.

1,453,694

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed July 11, 1921. Serial No. 483,668.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings wherein are obtained an efficient operation and economical construction, the parts being so arranged as to provide a preliminary spring friction action, automatically changing to the full spring friction action.

A more specific object of the invention is to provide a friction shock absorbing mechanism having main spring resistance with means interposed between the spring resistance and the friction elements so arranged that a part of the main spring resistance is employed during preliminary spring friction action and ultimately the entire spring resistance employed for obtaining the full capacity.

Other objects of the invention will more clearly appear from the description and claims appearing hereinafter.

In the drawing forming a part of this specification, Figure 1 is a horizontal longitudinal sectional view of a portion of a railway draft rigging showing my improvements in connection therewith. Fig. 2 is a vertical transverse sectional view corresponding substantially to the line 2—2 of Fig. 1 and Fig. 3 is detail perspective of one of the spring followers.

In said drawing 10—10 denote channel draft sills of a railway car underframe to the inner faces of which are secured front stop lugs 11 and rear stop lugs 12. The inner portion of a draw bar is indicated at 13, the same being operatively associated with the shock absorbing mechanism proper by a hooded cast yoke 14 and coupler key 15. The yoke, shock absorbing mechanism proper and front follower 16 are supported in operative position by a detachable saddle plate 17.

The improved shock absorbing mechanism proper, as shown, comprises, broadly, a combined friction shell and spring cage casting A; twin arranged main spring resistances B—B; a spring follower C; a second spring follower D; friction shoes E—E; a wedge F; anti-friction rollers G—G; a retainer bolt H; a spring washer J; and a spring K.

The casting A is formed at its front or outer end with a cylindrical friction shell proper 18 and rearwardly thereof with an integral rectangular spring cage proper 19, the latter having top and bottom parallel walls and an integral rear vertical wall 20, the latter functioning as the rear follower of the mechanism. The sides of the spring cage are open to permit insertion and removal of the spring followers C and D and the spring resistances B—B, in a well known manner.

Each of the spring resistances B is of well known form and, as customary, comprises an outer heavy coil 21 and an inner lighter nested coil 22. The rear ends of said coils 21 and 22 bear against the wall 20. The forward ends of the outer heavy coils 21 bear against the spring follower C and the forward ends of the inner lighter coils 22 bear against the other spring follower D, as shown in Fig. 1.

The spring follower C, shown best in Fig. 3, preferably consists of a substantially rectangular plate 23 and a forwardly extended hollow boss 24. The latter is slotted as indicated at 25 so as to permit the insertion of the head of the bolt H therewithin and hold it within the boss as clearly shown in Fig. 1. The outer edges of said follower C normally engage against shoulders 26—26 provided on the sides of the casting A as shown in Fig. 1.

The other spring follower D consists of a plate-like section 27 having rounded ends and parallel top and bottom edges of the outline best shown in Fig. 2. On its rear or inner side, said follower D is formed with a pair of integral rearwardly extended annular lugs or bosses 28—28 alined with and engaging the forward ends of the inner coils 22—22. Said bosses 28 work through suitable openings 29—29 provided in the follower C. The follower D normally engages against shoulders 30—30 formed at the inner end of the cylindrical shell proper 18, it being observed that said shoulders 30 are located forwardly of the shoulders 26 so as to leave a space between the followers C and D as indicated at 31, this space preferably approximating one-half inch in actual service. With this construction it is evident that there is approximately a half inch relative movement allowed between the followers C and D. The follower D is centrally apertured as indicated at 32 to allow the boss 24 of the follower C to extend therethrough.

The friction shoes E are preferably three in number arranged in a circular series in a well-known manner. The wedge F is of well known triangular form, the wedge F and shoes E having opposed wedge roller seats with the anti-friction rollers G interposed therebetween as customary in the Miner type of friction mechanism.

The front end of the retainer bolt H is anchored by the nut thereon within a suitable pocket formed in the wedge F.

The washer J is seated within the shoes E and bears against inwardly extended shoulders formed integrally with the shoes E as customary, and the light spring K is interposed between said washer J and the follower D. Said light spring K is under initial compression and is adapted to maintain all of the friction elements taut and to compensate for wear on the friction elements by gradual expansion, it being understood that this is extremely small in actual practice. Normally a very slight appearance as indicated at 33 will be left between the inner ends of the shoes E and the follower D, said clearance approximating preferably one-eighth of an inch and is left to insure the proper functioning of the spring K.

The operation is as follows, assuming an inward or buffing movement of the draw bar. As the draw bar and follower 16 move inwardly, the friction elements are pushed simultaneously in the same direction. For the first approximate one-eighth inch movement, the spring K will be compressed until the inner ends of the shoes E engage the follower D. For the next approximate one-half inch of the compression stroke, the shoes E will be resisted by only the inner lighter coils 20 which react through the follower D. After said one-half inch of the compression stroke, the overlapping parts of the followers D and C come into contact and thereafter both of said spring followers move simultaneously so that the full spring resistance of all of the coils is obtained to the movement of the friction elements. The release action will be understood by those skilled in the art without detailed description.

With my improved construction above described, it is evident that I am enabled to obtain a preliminary spring friction action of sufficient capacity to take care of the small or minor shocks which comprise the greater proportion of the shocks encountered in actual service conditions. This result is obtained without the introduction of any special preliminary springs and by using a part of the main springs. This is of advantage for the reason that the inner coils employed during the preliminary action are not subjected to full compression or to their full capacity and hence there is no danger of excessive compression on the preliminary springs. Furthermore, the result is obtained without requiring any greater space occupied by the parts than has been customary heretofore in mechanisms of the type disclosed in the drawing. The change from the preliminary spring friction action to the full spring friction action is obtained automatically and the capacities of the inner and outer coils may be so designed that the change from the preliminary to the full action will not represent any abrupt or excessive sudden change in capacity of the mechanism.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell; of wedge friction elements cooperable with the shell; a main spring resistance including nested inner and outer coils; and means interposed between said friction elements and the adjacent ends of said coil springs, actuated by the friction elements upon movement of the latter inwardly of the shell, said means compressing one coil only of each set of inner and outer nested coils initially for a limited distance and thereafter all of the nested coils.

2. In a friction shock absorbing mechanism, the combination with a friction shell; of wedge friction elements cooperable with said shell; a main spring resistance comprising twin arranged springs, each spring including outer and inner nested coils; and means, interposed between said friction elements and the adjacent ends of the springs, actuated by the friction elements upon movement of the latter relatively to the shell, said means compressing one coil of each set of the nested coils initially for a limited distance and thereafter all of the outer and inner nested coils.

3. In a friction shock absorbing mechanism, the combination with a friction shell; of wedge friction elements cooperable with the shell; a main spring resistance including a pair of outer and inner nested coils, the inner coil being lighter than the outer coil; and means, interposed between said friction elements and the adjacent ends of said coil springs, said means being actuated by the friction elements upon movement of the latter relatively to the shell, said means compressing the inner coil only initially for a limited distance and thereafter both coils simultaneously.

4. In a friction shock absorbing mechanism, the combination with a friction shell; of wedge friction elements cooperable with the shell; a main spring resistance comprising twin arranged springs, each of said springs comprising outer and inner nested coils; and means interposed between said friction elements and the adjacent ends of said twin arranged springs actuated by the friction elements upon movement of the latter relatively to the shell, said means compressing the inner coils only initially for a limited distance and thereafter all of the coils simultaneously.

5. In a friction shock absorbing mechanism, the combination with a follower acting casing; of a friction shell; wedge friction elements cooperable with the shell; a main spring resistance including nested inner and outer coils, each of said coils having one end abutting the rear wall of said casing; and means interposed between said friction elements and the adjacent opposite ends of said coil springs, actuated by the friction elements upon movement of the latter inwardly of the shell, said means compressing part only of the nested coils initially for a limited distance and thereafter all of the nested coils, said means including two spring followers normally separated, one of said followers directly engaging part only of said coils and the other follower, the remainder of the coils.

6. In a friction shock absorbing mechanism, the combination with a friction shell; of wedge friction elements cooperable with said shell; a main spring resistance comprising twin arranged springs, each spring including outer and inner nested coils; and means, interposed between said friction elements and the adjacent ends of the springs, actuated by the friction elements upon movement of the latter relatively to the shell, said means compressing one set of the nested coils initially for a limited distance and thereafter all of the outer and inner nested coils, said means including two spring followers normally separated, one of said followers engaging directly the inner coils and the other follower the outer coils only.

7. In a friction shock absorbing mechanism, the combination with a friction shell; of wedge friction elements cooperable with the shell; a main spring resistance including a pair of outer and inner nested coils, the inner coil being lighter than the outer coil; and means, interposed between said friction elements and the adjacent ends of said coil springs, said means being actuated by the friction elements upon movement of the latter relatively to the shell, said means compressing the inner coil only initially for a limited distance and thereafter both coils simultaneously, said means including two spring followers normally separated, the follower nearest the friction elements directly engaging the inner coil only and the follower farthest from the friction elements engaging directly the outer coil only.

8. In a friction shock absorbing mechanism, the combination with a casting having a friction shell proper and a spring cage integrally formed; of wedge friction elements cooperable with said shell; a main spring resistance within the cage proper, said main spring resistance comprising an outer coil and an inner nested lighter coil; a pair of normally separated spring followers interposed between said friction elements and the adjacent ends of spring coils, one of said followers having direct engagement with the inner coil only and the other with the outer coil only; and a spring interposed between one of said followers and some of the friction elements.

9. In a friction shock absorbing mechanism, the combination with a casting having a friction shell and spring cage integrally formed, said casting being provided with longitudinally offset sets of spring follower shoulders adjacent the friction shell; twin arranged springs within the spring cage, each of said springs comprising an outer coil and an inner nested coil; a spring follower having direct engagement with the outer coils only and normally engaging one set of said shoulders; a second spring follower directly engaging the inner coils only and normally engaging the other set of said shoulders, said spring followers having a limited amount of relative movement therebetween; and wedge friction elements cooperable with said shell.

10. In a friction shock absorbing mechanism, the combination with a casting having a friction shell and spring cage integrally formed, said casting being provided with longitudinally offset sets of spring follower shoulders adjacent the friction shell, twin arranged springs within the spring cage, each of said springs comprising an outer coil and an inner nested coil; a spring follower having direct engagement with the outer coils only and normally engaging one set of said shoulders; a second spring follower directly engaging the inner coils only and normally engaging the other set of said shoulders, said spring followers having a limited amount of relative movement therebetween; and wedge friction elements cooperable with said shell, the spring follower engaging with the inner coils being located nearer the friction elements than the other spring follower.

11. In a friction shock absorbing mechanism, the combination with a friction shell; of wedge friction elements cooperable with the shell; a main spring resistance including an outer coil and an inner coil arranged in nested relation; and pressure transmitting means interposed between said friction elements and the adjacent ends of said coil springs, said means being actuated by the friction elements upon movement of the latter relatively to the shell, said means compressing one of said two nested coils only initially for a limited distance, and thereafter both coils simultaneously.

In witness that I claim the foregoing I have hereunto subscribed my name this 5th day of July 1921.

JOHN F. O'CONNOR.

Witnesses:
 CARRIE GAILING,
 ANN BAKER.